United States Patent [19]

Malavieille

[11] Patent Number: 4,720,161

[45] Date of Patent: Jan. 19, 1988

[54] OPTICAL FIBER COUPLER-DISTRIBUTER, AND METHOD OF MANUFACTURE

[75] Inventor: François-Louis Malavieille, Paris, France

[73] Assignee: Alliance Technique Industrielle, Evry, France

[21] Appl. No.: 694,751

[22] Filed: Jan. 25, 1985

[30] Foreign Application Priority Data

Jan. 31, 1984 [FR] France ............... 84 01492

[51] Int. Cl.[4] ........................... G02B 6/38
[52] U.S. Cl. ................ 350/96.15; 350/96.20; 350/96.21
[58] Field of Search ............ 350/96.15, 96.16, 96.20, 350/96.21, 96.22, 96.23

[56] References Cited

U.S. PATENT DOCUMENTS

| | | | |
|---|---|---|---|
| 3,928,102 | 12/1975 | Rowe et al. | 350/96.15 |
| 4,083,625 | 4/1978 | Hudson | 350/96.15 |
| 4,109,369 | 8/1978 | Taylor | 350/96.21 |
| 4,135,779 | 1/1979 | Hudson | 350/96.15 |
| 4,176,908 | 12/1979 | Wagner | 350/96.15 |
| 4,184,739 | 1/1980 | d'Auria et al. | 350/96.15 |
| 4,400,055 | 8/1983 | Ozeki et al. | 350/96.15 |
| 4,469,401 | 9/1984 | Yamazaki et al. | 350/96.23 |
| 4,514,057 | 4/1985 | Palmer et al. | 350/96.15 |
| 4,629,284 | 12/1986 | Malavieille | 350/96.21 |

FOREIGN PATENT DOCUMENTS

| | | |
|---|---|---|
| 5792 | 12/1979 | European Pat. Off. |
| 2930454 | 2/1981 | Fed. Rep. of Germany |
| 151048 | 11/1979 | Japan |
| 85015 | 5/1982 | Japan |

OTHER PUBLICATIONS

Matsui et al., The Transactions of the IECE of Japan, E60, 3, Mar. 1977, "Optical Branch for Optical Data Distribution", pp. 133–134.

*Primary Examiner*—James W. Davie
*Assistant Examiner*—Frank González
*Attorney, Agent, or Firm*—Dennison, Meserole, Pollack & Scheiner

[57] ABSTRACT

A chamfer is polished on the side of each of two end portions of optical fiber (2A, 2B) so that the polished chamfers may be brought into contact to define an end face common to both fibers and of substantially the same cross section as that of a single fiber. A groove is formed in the top surface of a soft support (4), and the middle of the groove (5) is sized to receive the stripped ends of optical fibers. A glass plate (8) is applied to the top surface of the support to close the groove. The chamfered end fibers (2A, 2B) are inserted into the groove from one end so as to form said common end face in the middle of the groove. Another fiber (11) (or similarly prepared pair of fibers) is inserted from the other end of the groove to establish end-to-end optical co-operation between the fibers. The groove is filled with a liquid index-matching medium which sets when exposed to ultraviolet radiation. Once the index-matching medium has been set, the glass plate can be peeled off the support (4) bringing with it the optical fibers which are fixed thereto in a configuration which defines a very simple optical fiber coupler-distributer.

16 Claims, 15 Drawing Figures

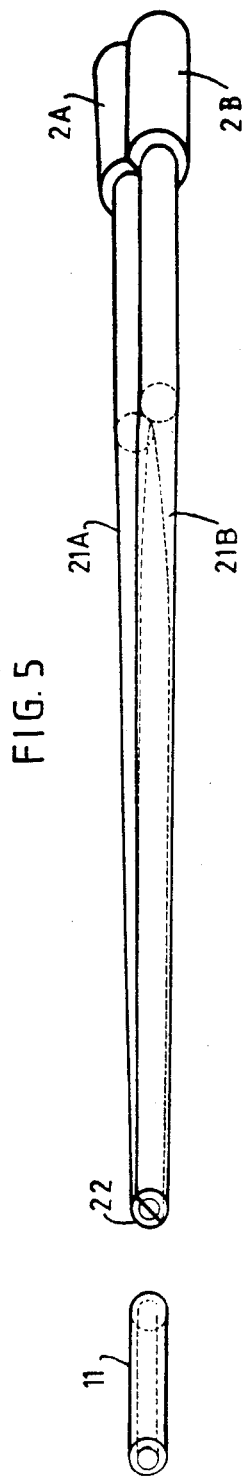
FIG. 5
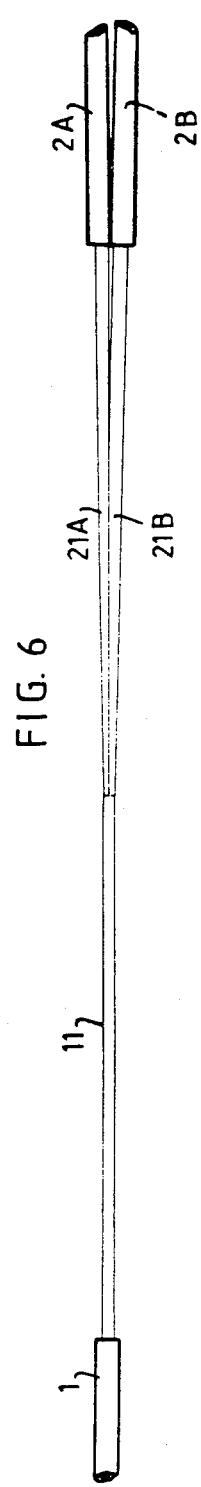
FIG. 6
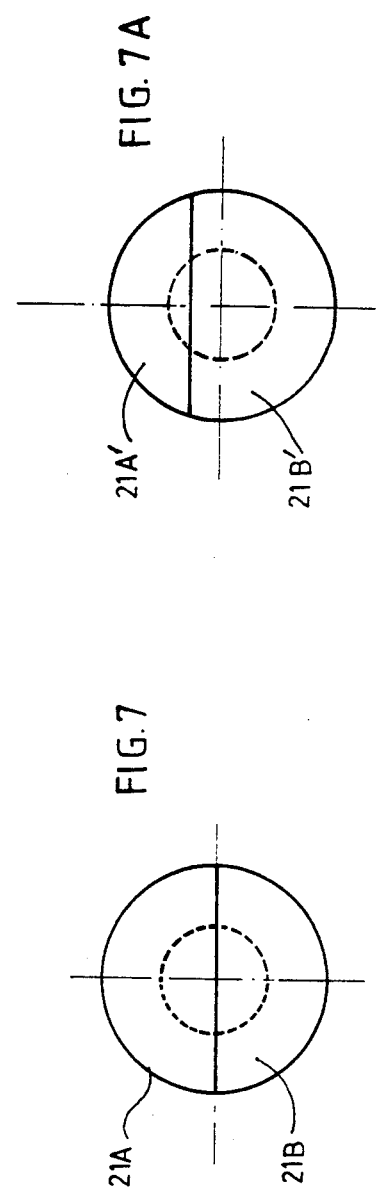
FIG. 7A
FIG. 7

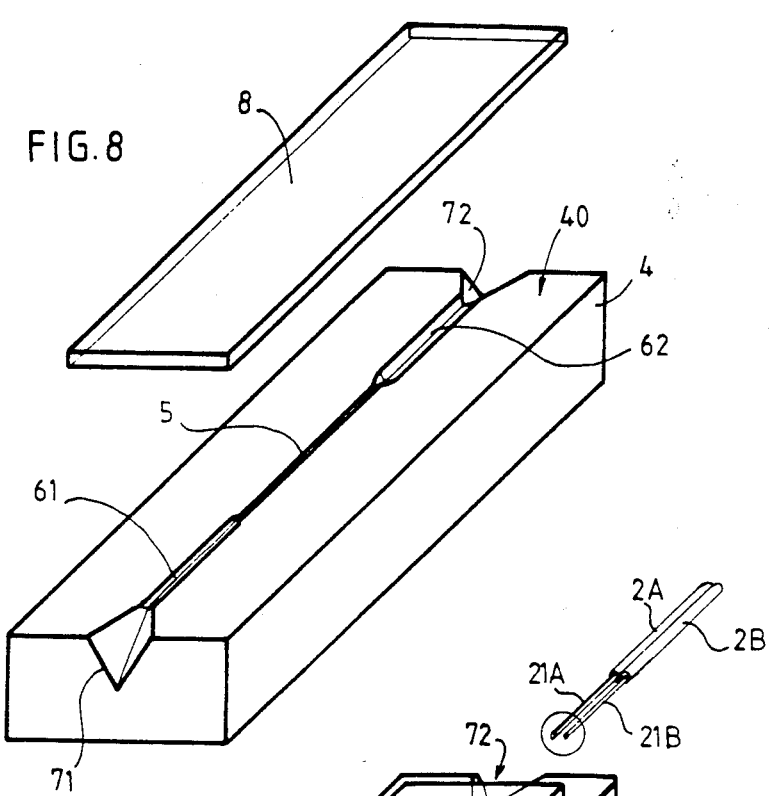
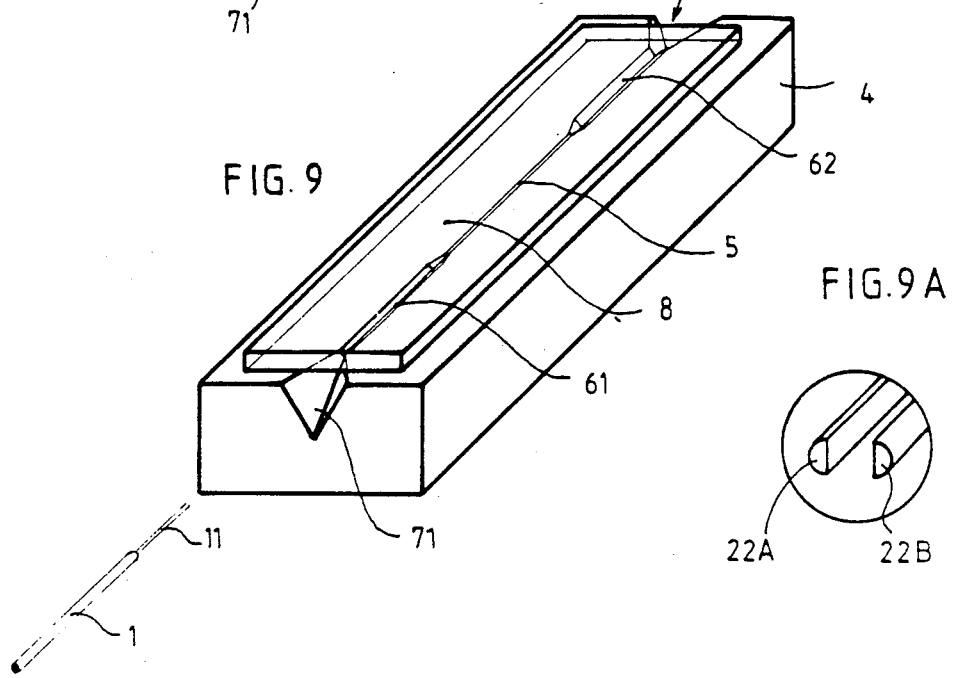

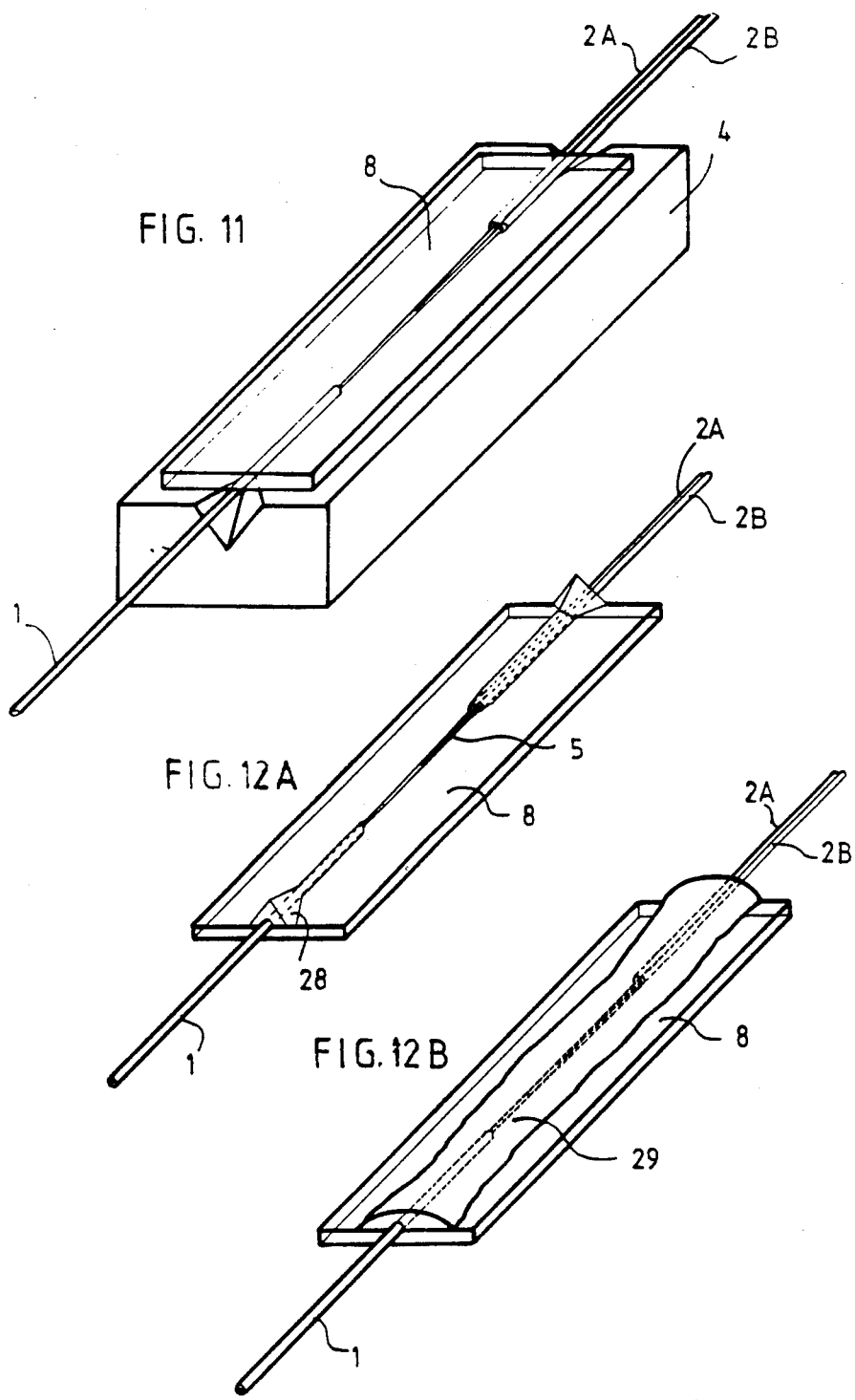

OPTICAL FIBER COUPLER-DISTRIBUTER, AND METHOD OF MANUFACTURE

The invention relates to a coupler-distributer for optical fibers.

BACKGROUND OF THE INVENTION

Optical fibers are becoming widespread for transmission purposes. Large scale optical fiber "wiring", and in particular "wiring" for large cities, requires various types of means for interconnecting optical fibers. Basic fiber-to-fiber interconnection is by putting two fibers end-to-end.

The Applicant's European patent applications 84 400 448.1 (published under the number 0 122 169) and 84 401 575.1 corresponding to U.S. applications Ser. No. 586,748, filed Mar. 6, 1984, now U.S. Pat. No. 4,629,284; and Ser. No. 636,738, filed Aug. 1, 1984, now U.S. Pat. No. 4,662,962, respectively, describe a technique for performing said basic fiber-to-fiber interconnection under conditions which are satisfactory both from the cost and from the performance points of view.

Another problem occurs in optical fiber cabling. The signal present on one optical fiber must also be capable of being distributed to a plurality of other fibers, and most often to two other fibers. The term "optical fiber coupler-distributer" is used herein to designate a device capable of performing this function.

Previous known solutions for providing optical fiber coupler-distributers have required difficult fabrication operations, in particular because of the need to obtain very accurate positioning of the fibers relative to one another.

Preferred embodiments of the present invention provide a novel solution which is greatly simplified.

SUMMARY OF THE INVENTION

The present invention provides an optical fiber coupler-distributer of the type comprising: firstly a first pair of optical fibers each having a polished and chamfered side at one end, said ends being positioned adjacent to each other in such a manner as to define a common end face of substantially the same cross section as that of a single fiber; and secondly another fiber, or another pair of fibers similarly disposed to define a second common end face, disposed in end-to-end optical co-operation with the said first pair by means suitable for fixing the fibers in said disposition.

According to a general aspect of the invention, the means for fixing the fibers in said disposition comprise a rigid plate together with retaining means for keeping the fibers pressed against the rigid plate.

In a preferred embodiment, the retaining means comprise a glue fixing the fibers to the rigid plate.

In a variant embodiment, the retaining means comprise a groove in a surface of a support and filled with a transparent index-matching liquid medium, the support, at least in the vicinity of said surface, being made of a material which is soft relative to the fibers and which is elastically deformable, the said surface being held in contact with the rigid plate and the fibers being axially urged into the said groove to ensure contact of the said end faces.

Most advantageously, the rigid plate is transparent, and is preferably made of glass, thus being constituted by the same basic material as the fibers themselves.

The method of manufacturing an optical-fiber coupler-distributer is of the type comprising:

(a) preparing at least two lengths of optical fiber by polishing chamfers in their sides and by cleaving them in their chamfered zones to obtain plane end faces perpendicular to the axes of the fibers and having shiny mirror type surfaces;

(b) positioning two lengths of chamfered fiber side-by-side so that their chamfered sides are in contact and so that their end faces combine to constitute a common light-transmitting end face having a shiny mirror type surface of substantially the same cross section as a single fiber; and (c) fixing the pair of fibers thus prepared in an end-to-end disposition with another optical fiber or with another pair of similarly prepared optical fibers in such a manner as to put the respective end faces into optical co-operation with each other.

According to the invention the method is improved as follows:

step (b) consists in inserting the chamfered ends of the fibers side-by-side in a groove in a surface of a support and filled with a transparent index-matching liquid medium, the support, at least in the vicinity of said surface, being made of a material which is soft relative to the fibers and which is elastically deformable, the said surface of the support being held in contact with a lapped transparent rigid plate and the relative positions of the chamfered fibers being adjusted to obtain the said common end face; and step (c) comprises inserting another fiber or another pair of fibers into the groove via its other end until contact is made with the end face of the first pair of fibers, and holding the set of fibers in this position.

In the preferred implementation of the invention, the transparent liquid medium used in step (b) is hardenable, in particular in response to ultraviolet radiation; and in step (c) the fibers are held in position by applying ultraviolet radiation to the groove through the transparent rigid plate, thus definitively fixing the fibers to the rigid plate which can then be removed from the soft support.

Additional covering may then applied to the fibers fixed to the plate.

In a variant of the method of the invention, the fibers are merely urged axially into the groove to ensure end-to-end contact.

According to another aspect of the invention, the groove has a symmetrical cross section about a plane perpendicular to the rigid plate.

In a particular embodiment, the groove includes a central zone suitable for receiving the stripped ends of the fibers, said central zone being situated between two end zones suitable for receiving the fibers together with their protective sheaths, said end zones terminating in flared inlet funnels.

According to yet another aspect of the invention, step (a) comprises the following steps:

(a.1) maintaining at least one optical fiber wound fixedly around a cylindrical mandrel of chosen diameter;

(a.2) bring a generator line of the mandrel together with the fiber into contact with a polishing surface, and holding the said mandrel firmly against the said polishing surface so as to polish a chamfer of chosen thickness at each turn of the fiber; and (a.3) cleaving each turn of the fiber substantially in the middle of the polished chamfered portion.

This technique thus provides a set of optical fiber components suitable for making optical fiber coupler-distributers in accordance with the invention.

BRIEF DESCRIPTION OF THE DRAWINGS

Embodiments of the invention are described by way of example with reference to the accompanying drawings, in which:

FIG. 5 is a perspective diagram showing how an interconnection is made between an inlet fiber and a pair of outlet fibers both of which receive a portion of the signal in the inlet fiber;

FIG. 6 is a diagram showing the same fibers as FIG. 5 but after they have been put into position for mutual optical co-operation;

FIGS. 7 and 7A show two variants of the joint between the pair of fibers to form a common end face of comparable size to the end face of a single fiber;

FIG. 8 shows a glass plate and grooved block of soft material for performing the method of the invention;

FIGS. 9 and 9A show the beginning of fiber insertion into the FIG. 8 apparatus;

FIG. 11 shows a variant, in which both the glass plate and the softer grooved block are retained in the final optical coupler-distributer; and FIGS. 12A and 12B show the preferred embodiment in which the final optical coupler-distributer includes only the glass plate and the optical fibers fixed thereto by means of glue.

MORE DETAILED DESCRIPTION

Optical fiber technology frequently makes use of specific shapes. The accompanying drawings are therefore to be considered as forming an integral part of the present description, for adding, when necessary, to the definition of the invention and to the sufficiency of its description.

Further, although the present invention is primarily concerned with an optical fiber coupler-distributer, and only secondarily with a method of manufacturing it, it appears desirable in order to facilitate understanding of the detailed description to begin by describing one example of how the sides of optical fibers may be polished, to continue by describing how a coupler-distributer can be manufactured from such side-polished fibers, and to terminate with a description of the finished product, ie. a fully-formed coupler-distributor, per se.

Figure 1:
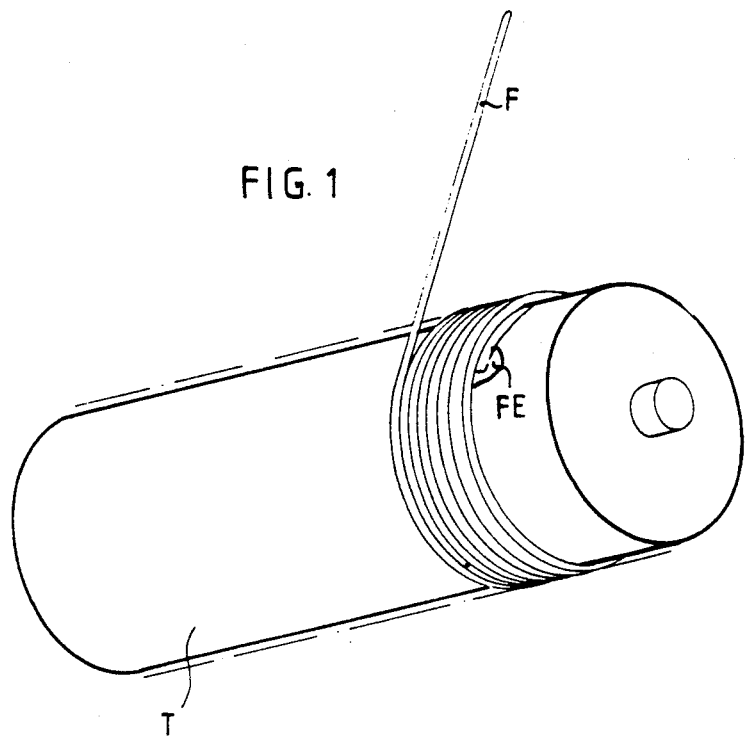
FIG. 1 is a perspective diagram of a mandrel on which an optical fiber is wound.

In FIG. 1, reference T designates a cylindrical mandrel on which a fiber F is wound. One of the ends FE of the fiber is glued to the mandrel. The fiber is then wound round the mandrel T with touching turns until its other end is glued thereto like the first end. Thus, providing the fiber is kept taut during winding, the entire length of the fiber is rigidly fixed to the mandrel T.

In a variant of the invention, a groove could be preformed in the mandrel T to receive the fiber in turns which would not then need to be touching. This variant requires both ends to be fixed as previously.

The radius of the mandrel T is determined as a function of the required length for the portions of fiber used to constitute a coupler-distributer (usually 25 cm to 30 cm) and above all on the desired size of the polished side ellipse, which is typically about a centimeter. These considerations have lead to the mandrel currently being used having a diameter of 15 cm.

Figure 2:
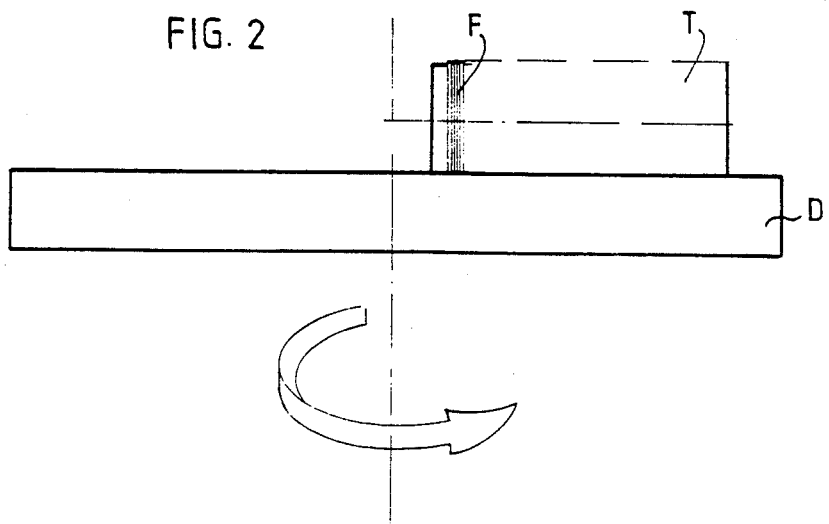
FIG. 2 is an elevation showing the mandrel pressed against a polishing disk to polish the chamfers on the fiber.

FIG. 2 shows how the mandrel T fitted with a full winding of fiber F is pressed against a rotating polishing disk D. The polishing surface of the disk D is fitted with a very fine abrasive, typically comprising aluminum oxide particles having a size of a few microns. Other polishing materials may be used, such as silicon carbide or tungsten carbide, or else specific glass-polishing abrasives may be used. A single polishing pass is required. However, it is also possible to begin with a larger grain size and then terminate with a final pass using a smaller grain size.

Figure 3:
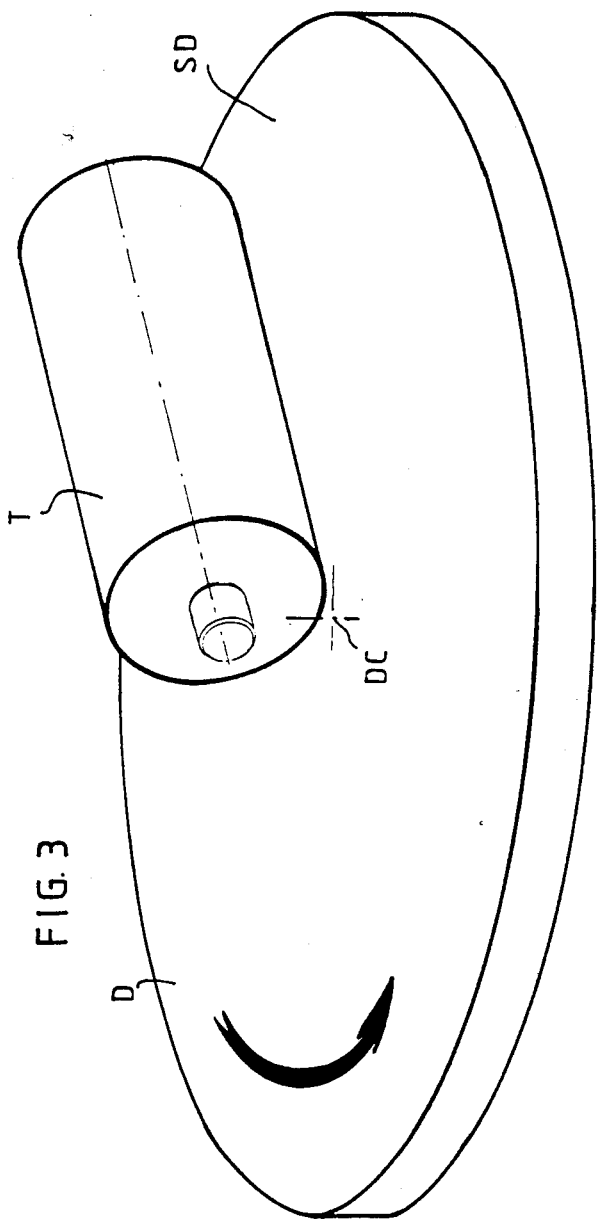
FIG. 3 is a perspective view corresponding to FIG. 2.

FIG. 3 is a perspective view of the polisher. The polishing disk D turns about its own axis passing through its center DC. The mandrel T is held firmly so that the fiber thereon comes into contact with the polishing surfaces SD while preventing any rotation of the mandrel T about its own axis.

The force with which the mandrel should be applied against the disk D and the admissible downwards excursion for the mandrel are determined experimentally. In particular, a constant force may be used to press the mandrel T against the disk D and the desired polishing thickness can then be obtained by suitable choice of the length of time the mandrel T remains pressed against the disk D.

Figure 4:
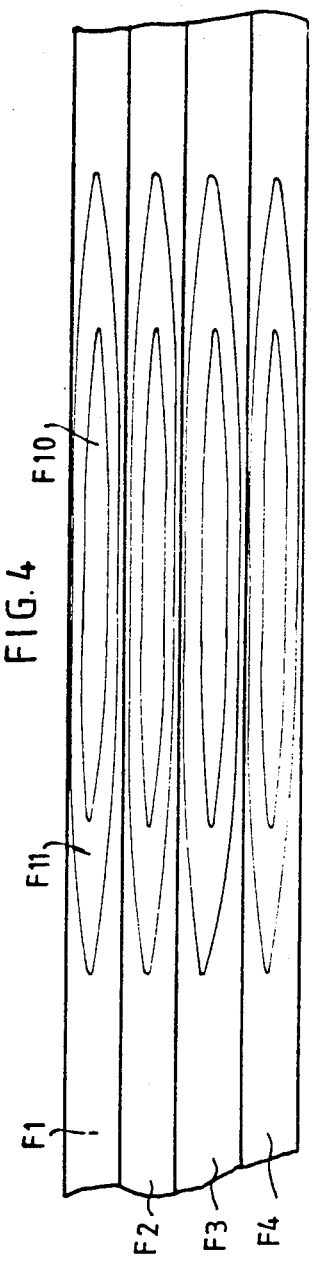
FIG. 4 shows a plurality of fibers which have had chamfers polished into their sides by the means shown in FIGS. 2 and 3.

As a general rule, the optical fibers are polished through to one half of their thickness. The result is shown in FIG. 4 where the fibers are shown on a much enlarged scale and after being unwound. On each of the fibers F1 to F4 there can be seen an ellipse of polished core F10 surrounded by an ellipse of polished cladding F11.

The fibers are normally cleaved in the middle of the ellipse F10. This may be done by the method described by the Applicants in their French patent application published under the number 2 422 604. In outline, this consists in scoring the fibers with a small diamond perpendicularly to the axis of the fibers while the fibers are held by suitable means.

This provides a collection of lengths of fiber, with each length having a polished chamfer at each end. Such a double-ended length can be used directly if a plurality of coupler-distributers are to be disposed in cascade. Otherwise, the lengths are again cleaved at a point situated away from the chamfered ends. This provides a collection of lengths of fiber, each of which has one end which is chamfered and is cleaved at a point of approximately half thickness, and another end which has no chamfer and which is cleaved at a point of full thickness. The end faces obtained are of the shiny mirror type suitable for end-to-end fiber interconnection.

Another variant consists in cleaving the fibers away from the middle of the ellipse F10. This provides segments of fiber which are complementary and which may be connected side-by-side while retaining an overall size which is equal to that of a single fiber. Such an arrangement can be used for asymmetrical coupling in which one of the fibers receives more light than the other.

However, when asymmetrical couplings are to be made, it is presently preferred to adjust the polishing time so as to obtain the two complementary lengths of fiber to be connected side-by-side during two separate polishing operations, which may include using mandrels of different diameters. In either case the resulting assembly has the same overall size as a single fiber.

In FIGS. 7 and 7A:

FIG. 7 shows a symmetrical coupling between two joined fibers which have both been polished to one half of their thickness; and FIG. 7A shows an asymmetrical coupling between two joined fibers, one of which has been polished to one third of its thickness while the other has been polished to two thirds of its thickness.

The remainder of the present description relates to the symmetrical disposition as shown in FIG. 7, and the person skillked in the art can readily transfer the teaching to the asymmetrical case shown in FIG. 7A.

In FIG. 5, two fibers 2A and 2B have unsheathed ends 21A and 21B which are joined to put their chamfered faces into contact, thus providing a common end face 22 which is comparable to the end face 11 of a single fiber placed in end-to-end relationship thereto.

FIG. 6 shows the same fibers after their end faces have been brought into contact.

It is clear that in some applications the fiber 1 and its end face 11 could be replaced by a second pair of joined fibers having chamfered sides and similar to the pair of fibers 2A and 2B and their ends 21A and 21B.

FIG. 8 shows means for performing the invention as described below.

One of the components is a support of soft material 4 which is preferably parallelipipedal in shape. The support 4 is made of a material which is elastically deformable and which is soft relative to the fibers, e.g. an elastomer. The support 4 has a top surface designated 40 in which there is at least one groove referenced 5.

Preferably, the groove is defined in the middle portion of the surface 40 and is shaped to match the size of the bared end portions of the fibers. The groove 5 lies between end portions 61 and 62 of larger size but substantially in alignment therewith, and these portions in turn are terminated by flared portions 71 and 72 at the ends of the support 4. As shown, the entire support is made of the soft material. However, to perform the invention, it is only essential for the support to be soft in the immediate vicinity of the surface 40.

The support co-operates with a rigid plate 8, and in particular with a plate of transparent glass which is pressed against the surface 40 of the support 4. A similar device is described in the Applicant's European patent applications numbers 84 400 448.1 and 84 401 575.1, corresponding to U.S. applications Ser. No. 586,748, filed Mar. 6, 1984, now U.S. Pat. No. 4,629,284; and Ser. No. 636,738, filed Aug. 1, 1984, now U.S. Pat. No. 4,662,962, respectively.

The content of these prior descriptions is to be considered as being incorporated in the present description for contributing where necessary to a better understanding of the device shown in FIG. 8, and possible variants thereof.

In particular, the above applications describe various groove shapes.

Figures 10, 13:
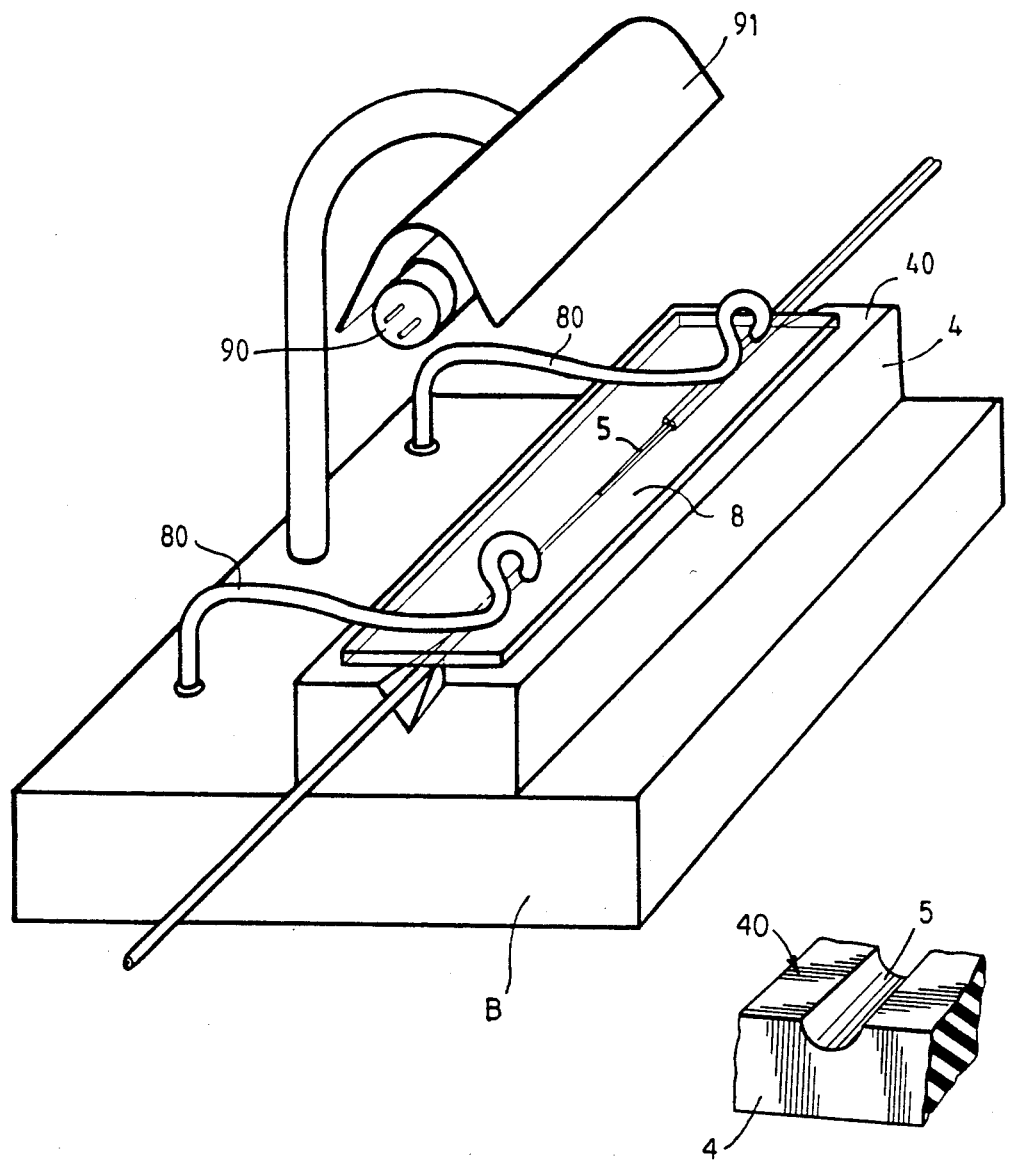
FIG. 10 is a perspective diagram showing the fibers fully inserted and being subjected to ultraviolet setting, in the context of a preferred implimentation of the invention.
FIG. 13 shows a U-groove in a grooved block.

At present, the Applicants believe that for making a coupler-distributor, it is desirable for the right cross section of the groove to be symmetrical about a plane perpendicular to the rigid plate, i.e. to the surface 40. Satisfactory results have been obtained with grooves having a V-shaped section and also with grooves having a U-shaped cross section. FIG. 13 shows a U-groove in a grooved block.

Reference is now made to FIG. 9. Both ends 21A and 21B of the chamfered end fibers 2A and 2B are both inserted into the groove 5 from one end of the support 4. They may be inserted one after the other or else they may be inserted together, and in either case their chamfered faces should face each other (see FIG. 9A). The two fibers are inserted until their end faces reach the middle of the groove 5. Their relative position is then adjusted so that their end faces provide a common end face by their two half faces 22A and 22B coming into alignment.

The fiber 1 is then inserted from the other end of the groove until its own end face 11 comes into contact with the common end face 21A and 21B. A slight thrust on the fiber 1 ensures good contact between the end faces and also serves to eliminate and offset which may have been left between the half faces 21A and 21B.

FIG. 9 illustrates this action taking place without the support 4 being itself supported in any kind of jig or other support system. FIG. 10 gives a more realistic impression by showing a jig B for use in implementing the method. The soft support 4 is placed on the jig B, and the plate of glass 8 is pressed down on the support 4 which thus presses in turn against the jig B. The clamping force is provided by first and second clamps 80 fixed to the jig B. The fibers can then be inserted.

In this preferred embodiment shown in FIG. 10, the index-matching medium placed in conventional manner in the groove is selected from glues which are set or hardened by ultraviolet radiation, such as the liquid glue which is polymerized by ultraviolet light and is sold under the trade mark Glass-Bond by the Loctite company. Naturally, other setable index-matching media could be used, and they could be setable by agents other than ultraviolet radiation.

If ultraviolet radiation is used, the FIG. 10 jig includes a UV tube 90 disposed parallel to the axis of the groove 5. The tube is provided with a reflector 91 to direct the major part of the radiation towards the groove. The setable medium is then subjected to ultraviolet radiation for as long as necessary to ensure complete polymerization.

Thereafter, the plate of glass 8 may be removed, taking with it the optical fibers which are glued thereto. It has been observed that, in practice, the above-mentioned glue hardly adheres to the soft material of the upper surface 40, and in particular, that the glue does not damage either the surface 40 or the groove 5.

The coupler-distributer then has its final basic shape. FIG. 12A shows the glass plate 8 turned over and the optical fibers glues thereon, with the single optical fiber 1 at one end, and the pair of fibers 2A and 2B at the other end. A very thin layer of glue adheres to the bared ends of the fibers where the groove 5 used to be. The layer of glue has taken up the shape of the groove as though molded, and thus the ends of the glue layer 28 are of greater thickness matching the portions 61 and 61 and then the flared portions 71 and 72.

A protective coating is then applied to the layer of glue 28, e.g. a layer of resin as shown in FIG. 12B.

The free ends of the lengths of fiber 2A and 2B may themselves be received in conventional end-to-end optical connectors, and preferably one such as described in the Applicants' above-mentioned patent applications. The connection is then extended by longer optical fibers. In a variant, is a new distribution of light is required, the free ends of the fibers 2A and 2B are in turn engaged as the single fibers in two respective further optical coupler-distributers disposed like the coupler-distributer described above.

Such an assembly could make use of couplers having a pair of chamfered fibers at each end, otherwise known as a X-coupler or as a four-port coupler.

To make such couplers, a variant of the invention consists in not cleaving the fibers in their chamfered zones, but simply placing two entire chamfered zones in intimate contact with each other in the groove, then placing the glass plate on top of the groove after filling it with the index-matching liquid or glue.

The invention thus provides important means for cabling optical fibers in geographically widespread areas.

We return to FIG. 11, which shows a support block 4 and glass plate 8 away from the supporting jig B and ultraviolet radiation source.

In a variant of the invention, the index-matching liquid medium placed in the groove 5 is not a setting medium (and in some cases may be omitted altogether). The equipment shown in FIG. 11 is thus associated with a rigid housing for keeping the plate 8 pressed against the block of soft material 4, and for keeping the end faces of the fibers 1 and 2A & 2B urged axially against each other, as described, for example, in the Applicant's European patent application 84 400 448.1 (published under the number 0 122 169) corresponding to U.S. application Ser. 586,748, filed Mar. 6, 1984, now U.S. Pat. No. 4,629,284. To this end, the various different embodiments described in the prior application are to be considered as being incorporated in the present application.

Although this arrangement is bulkier than the arrangement described with reference to FIGS. 12A and 12B, a coupler-distributer obtained in this manner may be preferred in some cases, in particular if it enables the various optical components to be freely disassembled.

Finally, it is advantageous for facilitating proper relative positioning of the ends of the fibers for the sides of the fibers to be colored, e.g. as described in European patent application No. 84 400 448.1, corresponding to U.S. Ser. No. 586,748, filed Mar. 6, 1984, now U.S. Pat. No. 4,629,284. In particular, different colors are used for the bared ends of the fibers 2A and 2B, and a third color may be used for the bared end of the fiber 1.

I claim:

1. An optical fiber coupler-distributer of the type comprising: firstly a first pair of optical fibers each having a polished and chamfered side at one end, said ends being positioned adjacent to each other in such a manner as to define a common end face of substantially the same cross section as that of a single fiber; and secondly another fiber, or another pair of fibers similarly disposed to define a second common end face, disposed in end-to-end optical co-operation with the said first pair by means suitable for fixing the fibers in said disposition, the coupler-distributer further including the improvement whereby the means for fixing the fibers in said disposition comprise a rigid plate together with retaining means for keeping the fibers pressed against the rigid plate.

2. A coupler-distributer according to claim 1, wherein the retaining means comprise a glue fixing the fibers to the rigid plate.

3. A coupler-distributer according to claim 1, wherein the rigid plate is transparent.

4. A coupler-distributer according to claim 1, wherein the rigid plate is made of glass.

5. A coupler-distributer according to claim 1, wherein the sides of the end portions of the fibers are colored for facilitating relative positioning.

6. An optical fiber coupler-distributer of the type comprising: firstly a first pair of optical fibers each having a polished and chamfered side at one end, said ends being positioned adjacent to each other to define a common end face of substantially the same cross section as that of a single fiber; and secondly another fiber, or another pair of fibers similarly disposed to define a second common end face, disposed in end-to-end optical co-operation with the said first pair by means suitable for fixing the fibers in said disposition, the coupler-distributer further including the improvement whereby the means for fixing the fibers in said disposition comprise a rigid plate together with retaining means for keeping the fibers pressed against the rigid plate, said retaining means comprising a groove in a surface of a support and filled with a transparent index-matching liquid medium, the support, at least in the vicinity of said surface being made of a material which is soft relative to the fibers and which is elastically deformable, the said surface being held in contact with the rigid plate and the fibers being axially urged into the said groove to ensure contact of the said end faces.

7. A method of manufacturing an optical-fiber coupler-distributer comprising:
   (a) preparing at least two lengths of optical fiber by polishing chamfers in their sides and by cleaving them in their chamfered zones to obtain plane end faces perpendicular to the axes of the fibers and having shiny mirror type surfaces;
   (b) positioning two lengths of chamfered fiber side-by-side so that their chamfered sides are in contact and so that their end faces combine to constitute a common light-transmitting end face having a shiny mirror type surface of substantially the same cross section as a single fiber; and
   (c) fixing the pair of fibers thus prepared in an end-to-end disposition with another optical fiber or with another pair of similarly prepared optical fibers in such a manner as to put the respective end faces into optical co-operation with each other;
   the method including the improvement wherein:
   step (b) consists in inserting the chamfered ends of the fibers side-by-side in a groove in a surface of a support and filled with a transparent index-matching liquid medium, the support, at least in the vicinity of said surface, being made of a material which is soft relative to the fibers and which is elastically deformable, the said surface of the supprot being held in contact with a lapped transparent rigid plate and the relative positions of the chamfered fibers being adjusted to obtain the said common end face; and
   step (c) comprises inserting another fiber or another pair of fibers into the groove via its other end until contact is made with the end face of the first pair of fibers, and holding the set of fibers in this position.

8. A method according to claim 7, wherein the transparent liquid medium used in step (b) is hardenable, in particular in response to ultraviolet radiation; and wherein in step (c) the fibers are held in position by applying ultraviolet radiation to the groove through the transparent rigid plate, thus definitively fixing the fibers to the rigid plate which can then be removed from the soft support.

9. A method according to claim 8, wherein an additional covering is then applied to the fibers fixed to the plate.

10. A method according to claim 7, wherein the groove has a symmetrical cross section about a plane perpendicular to the rigid plate and longitudinal of said groove.

11. A method according to claim 10, wherein the groove includes a central zone suitable for receiving the stripped ends of the fibers, said central zone being situated between two end zones suitable for receiving the fibers together with their protective sheaths, said end zones terminating in flared inlet funnels.

12. A method according to claim 11, wherein the groove is V-shaped in cross section.

13. A method according to claim 11, wherein the groove is U-shaped in cross section.

14. A method according to claim 13, wherein step a) comprises the following steps:
- (a.1) maintaining at least one optical fiber wound fixedly around a cylindrical mandrel of chosen diameter;
- (a.2) bring a generator line of the mandrel together with the fiber into contact with a polishing surface, and holding the said mandrel firmly against the said polishing surface so as to polish a chamfer of chosen thickness at each turn of the fiber; and
- (a.3) cleaving each turn of the fiber substantially in the middle of the polished chamfered portion.

15. A method according to claim 7, wherein step a) comprises the following steps:
- (a.1) maintaining at least one optical fiber wound fixedly around a cylindrical mandrel of chosen diameter;
- (a.2) bring a generator line of the mandrel together with the fiber into contact with a polishing surface, and holding the said mandrel firmly against the said polishing surface so as to polish a chamfer of chosen thickness at each turn of the fiber; and
- (a.3) cleaving each turn of the fiber substantially in the middle of the polished chamfered portion.

16. A method according to claim 9, wherein step (a) comprises the following steps:
- (a.1) maintaining at least one optical fiber wound fixedly around a cylindrical mandrel of chosen diameter;
- (a.2) bring a generator line of the mandrel together with the fiber into contact with a polishing surface, and holding the said mandrel firmly against the said polishing surface so as to polish a chamfer of chosen thickness at each turn of the fiber; and
- (a.3) cleaving each turn of the fiber substantially in the middle of the polished chamfered portion.

* * * * *